Feb. 10, 1948. F. A. TRINKLE ET AL 2,435,910
APPARATUS FOR PRODUCE TOPPING AND TOP HARVESTING
Filed Nov. 31, 1943 4 Sheets-Sheet 1
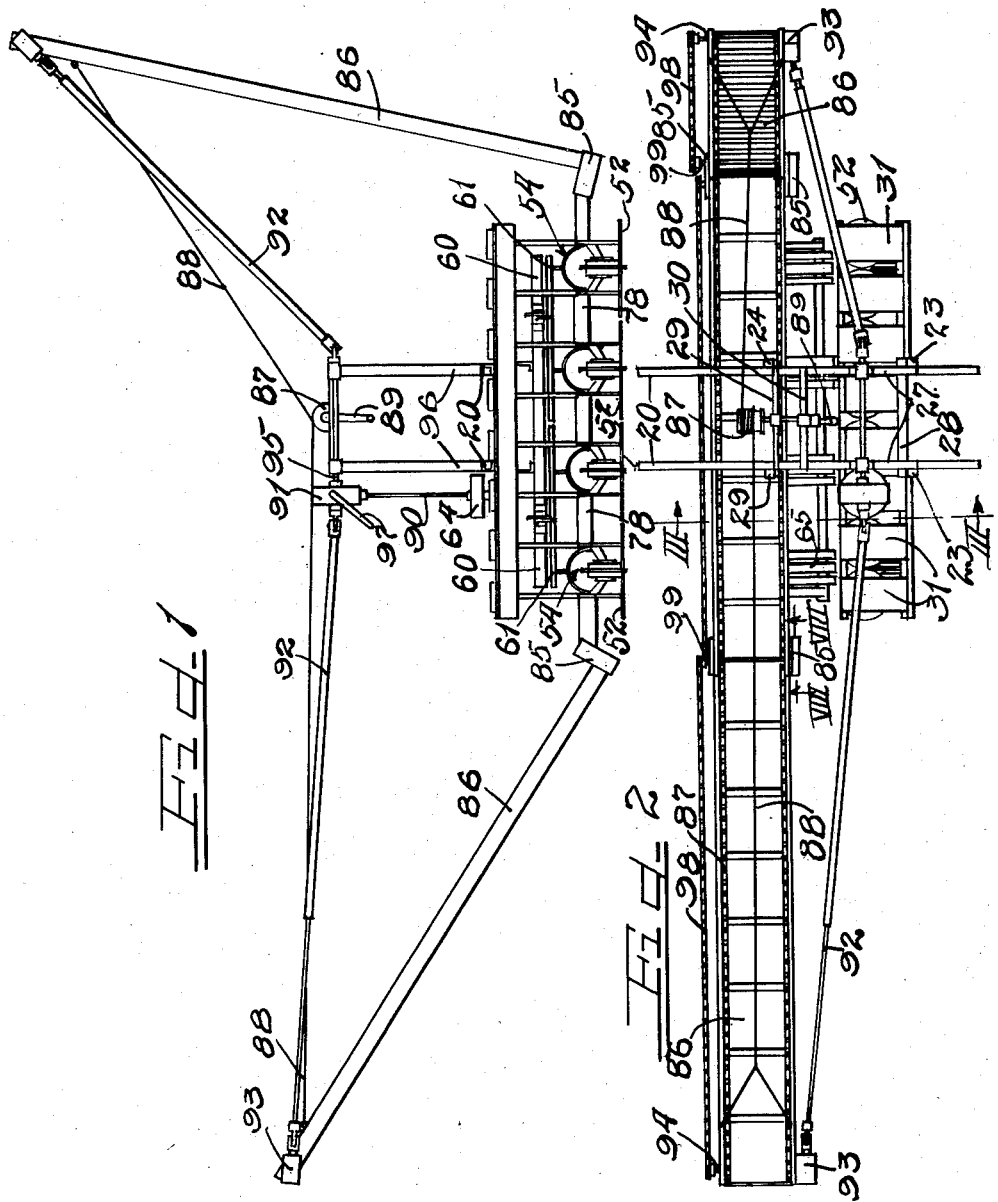
Inventors
Frederick A. Trinkle
Jack Schwindt
by Charles W. Hills Attys.

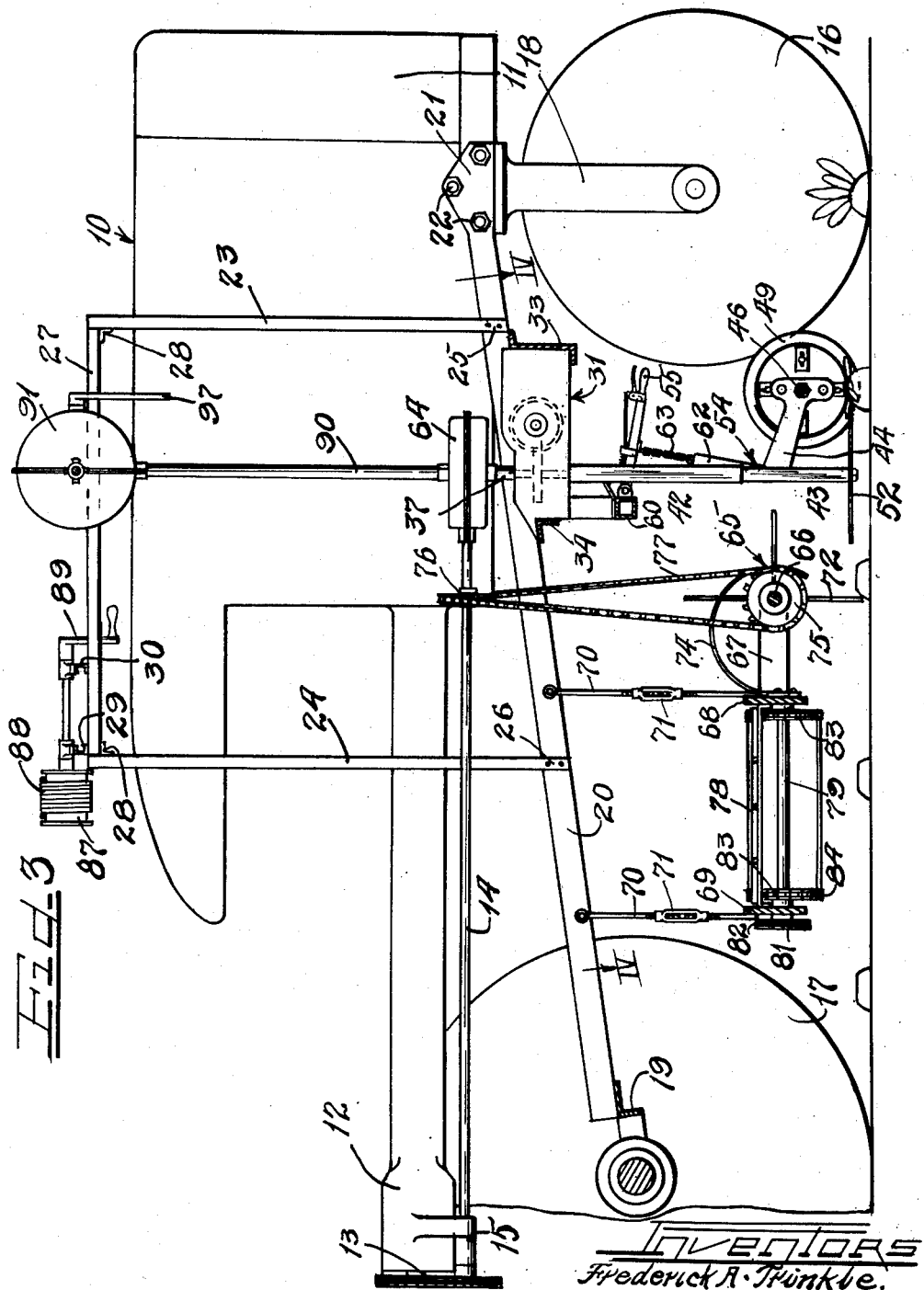

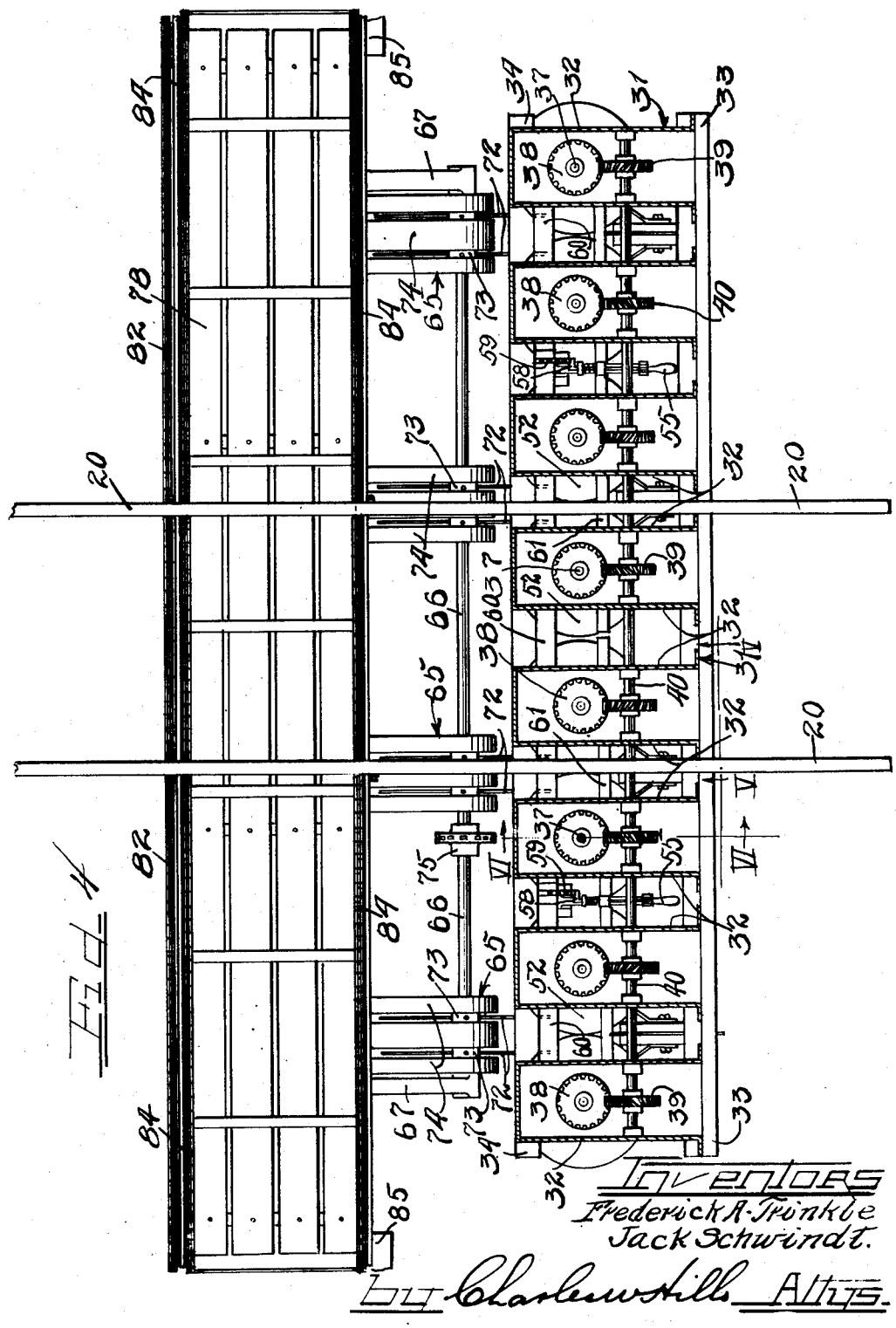

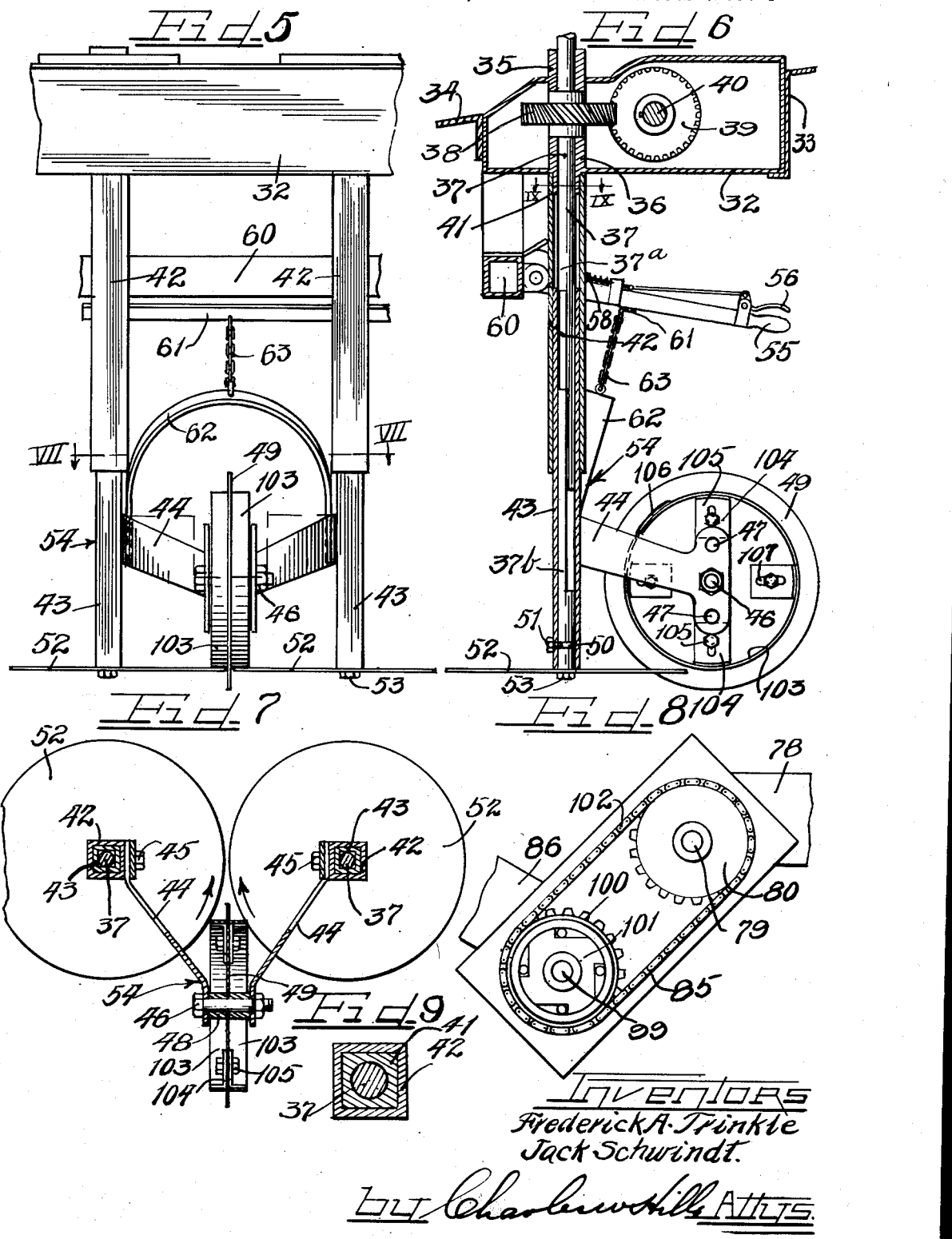

Patented Feb. 10, 1948

2,435,910

UNITED STATES PATENT OFFICE 2,435,910

APPARATUS FOR PRODUCE TOPPING AND TOP HARVESTING

Frederick A. Trinkle and Jack Schwindt, Fort Morgan, Colo.; said Schwindt assignor to said Trinkle Application May 31, 1943, Serial No. 489,146

17 Claims. (Cl. 55—107)

This invention relates to an apparatus for topping produce and is directed more particularly to an improved means for topping produce such as, beets or the like, while still in the ground.

It is a primary object of the invention to provide means whereby the tops of produce such as beets may be mechanically, quickly and uniformly severed at the crown part thereof from the root portion while the same is in the ground.

Still another object of the invention is to provide an improved power driven harvester in which there is provided an improved multi-row topping mechanism having an improved drive mechanism associated therewith.

Still another object of the invention is to provide an improved automatically and manually adjustable mounting for harvest topping knife units.

It is a further object of the invention to provide, for a harvesting implement of the above character, improved guiding means for a cutting mechanism which includes a guide wheel arranged so that the peripheral margin thereof cuts into the top surface of the soil in which a beet is growing and through the brush or top growth of the beet and having means thereon for delimiting the depth of the cut of the guide wheel into the beets.

It is a further object of the invention to provide for a topping implement, improved means for adjustably determining the level of topping knives therein relative to the surface of the earth over which the implement travels.

It is a still further object of the invention to provide for a beet topping implement improved means for anchoring the cutting units therein against lateral shift due to cutting action on the crop being treated.

The invention further resides in the structural details and in the combination, construction and arrangement of the several parts of the improved topping implement whereby the resulting device is of extreme simplicity, is readily and easily operated and maintained by an unskilled user, is less costly to manufacture and is otherwise more advantageous than topping implements heretofore used, as will be more fully explained presently.

In accordance with the general features of our invention there is provided herein a vegetable topping, and top gathering implement which may be readily associated with the conventional tractor body and which may be operated by a power take-off from the engine of the tractor with which it is associated, the implement including a drive mechanism having a drive connection to laterally extensible and retractible conveyors and to a central conveyor, the direction of which may be changed in accordance with the operation of one or the other of the lateral conveyors, there also being provided power drive connections to a top gathering mechanism associated with the central conveyor.

In accordance with still other general features of the invention there is provided herein a plurality of beet topping units, one of which has a drive connection to the power take-off of the tractor with which the implement is associated, and the others deriving their driving power from said first named driven unit, each unit including a pair of laterally disposed, oppositely rotatable cutting disks which cooperate to cut through the beet from opposite sides thereof and a guide wheel for predetermining the depth of the cut of the cutting disks, each of said guide wheels including a peripheral marginal portion arranged to ride over the earth and over the tops of the crops being topped and having means for predetermining the depth of the cut of the marginal portion thereof into the beets as it rides thereover, thereby to predetermine the depth of the cut by the topping means into the crown of the beets.

Other objects and advantages of the invention will become apparent from the following description and accompanying drawings in which:

Figure 1 is a front elevational view of an implement embodying the features of our invention;

Figure 2 is a top plan view thereof;

Figure 3 is a cross-sectional view taken on the line III—III of Figure 2;

Figure 4 is a cross-sectional view taken on the line IV—IV of Figure 3;

Figure 5 is a cross-sectional view taken on the line V—V of Figure 4;

Figure 6 is a cross-sectional view taken on the line VI—VI of Figure 4;

Figure 7 is a cross-sectional view taken on the line VII—VII of Figure 5;

Figure 8 is an enlarged fragmentary side elevational view of the joint connection between the central conveyor and the laterally disposed conveyor shown in Figure 1; and Figure 9 is a cross-section taken on the line IX—IX of Figure 6.

It is to be understood that the embodiment shown herein is for illustrative purposes only and may be changed or modified without departing from the spirit and scope of the invention as set forth in the appended claims.

As shown best in Figure 3, the vegetable topping implement embodying our invention may be conveniently attached to motive means such as a tractor 10 having a forward engine housing 11 and a rearwardly extending drive shaft housing 12 at the rear end of which is provided a suitable power take-off sprocket arranged to drive a chain 13 which in turn drives a sprocket at the rear end of a drive shaft 14 rotatably mounted in a box 15 disposed in depending relationship to the rear end of the housing 12. The tractor may be provided with front and rear wheels 16 and 17 respectively, suitable means such as standard 18 for the forward wheels being provided to rotatably mount the same. It will be understood that any suitable conventional drive connection may be provided between the motor housed in the housing 11 and the wheels.

While many different expedients may be utilized for securing the topping assembly to the tractor or other prime mover, there is provided herein a rear axle assembly for the wheels 17 which includes a cross bar 19 upon which the rear end of longitudinally extending inclined members 20 may be secured. The forward ends of the inclined members 20 may be provided with enlarged portions 21 arranged to receive bolts 22 by which they are secured to the side of the tractor frame.

The topping and top gathering mechanism is supported upon the tractor, as shown in Figures 1, 2 and 3, by a supporting structure which comprises upright standards 23 and 24 disposed on each side of the engine housing 11 and secured to the inclined members 20 as at 25 and 26, longitudinally extending members 27, laterally disposed angles 28, crossbeam 29, and an intermediate crossbeam 30.

The topping assembly, as will best be seen from Figures 3 and 4, includes a plurality of actuating units 31 each of which includes an upper drive mechanism housing 32, supported and secured together by means of a forwardly disposed crossbar 33 and a rearwardly disposed crossbar 34. As will be seen from Figure 6, the upper and lower walls of the housings 32 are provided with bosses 35 and 36 respectively these bosses being arranged to rotatably receive and support revolving shafts 37 and having their opposed ends spaced within the respective housings to receive a driving gear 38 which is fixedly secured to the respective shafts 37. The gears 38 each mesh with a companion gear 39 which is fixedly secured to a common laterally extending drive shaft 40.

As will be seen from Figures 6 and 9, the lower boss 36 of each of the drive units is provided with an exteriorly square depending part 41 through which the shaft 37 extends and on the outside of which is secured, by a press fit or in any other suitable manner, a depending tubular member 42 adapted to slidably receive a mounting member 43 which, with a like companion structure supports the top cutting and guiding mechanism in a manner to be presently described. Each pair of members 43, as will be seen from Figure 7, is provided on the adjoining exterior faces thereof with arms 44 secured thereto as by bolts 45. The free ends of said arms 44 are joined by a bolt 46 which extends through one of several pairs of holes 47 in said arms 44, the extra sets of holes being provided for purposes of adjustment. Rotatably mounted about the shank of bolt 46 as by a hub portion 48 is a disk-like guide and cutting member 49.

Each shaft 37 is formed with upper and lower segments 37a, 37b, respectively, which are advantageously slidably keyed and slotted so as to permit being extended in the manner shown in Figure 6 without, however, affecting their ability to be positively driven from the gear 38. The lower segment 37b of shaft 37 is provided with an annular groove 50 cut therein. The end of a stud bolt 51 secured to mounting member 43 registers with the annular groove 50 so that the shaft segment 37b will be free to rotate but will be capable of being moved axially with said member 43 slidably mounted in tubular member 42. A circular knife blade 52 is demountably secured to the lower end of shaft segment 37b of each shaft 37 as by bolt 53.

The guide member 49 of each topping unit 54, as will be seen from Figure 3, is so positioned as to be between and in advance of the adjoining edges of each pair of knife blades 52 and is adapted to traverse the surface of the ground and the crowns of the beets growing therein. In so doing, the guide member 49 moves up and down corresponding with the surface it traverses causing the shaft segment 37b and also mounting member 43 to be raised or lowered in the tubular member 42 thereby adjusting the path of knife blades 52 with respect to the crowns of the beets. It will be understood, that suitable lubricating means (not shown) are provided to insure freedom of action of the shaft segment 37b and mounting member 43.

The structure of shaft 37 also makes possible the lifting of the several knife blades 52 and guide members 49 off the ground at such times as the apparatus is being turned around or being driven to the scene of operations. To accomplish this purpose a lever 55 with an adjustable pawl lever 56 controlling a pawl 58 and ratchet 59 (see Figure 4) is provided. Levers 55, of which two are employed in the illustrated apparatus, are pivotally mounted on the support 60 depending from the housing 32. A laterally extending angle 61 secured to said lever 55 provides a means to which a plurality of yoke members 62, one for each topping unit 54, may advantageously be coupled by link member 63. Thus, when the lever 55 is raised each pair of knife blades 52 for each topping unit 54 associated therewith will be raised by reason of the fact that segment 37b and mounting member 43 will be telescoped within the tubular member 42.

The drive for the topping units 54 is advantageously provided by extending one or more (one in the apparatus shown) of the shafts 37 through the boss 35 in the top of housing 32 and into gear case 64 which encloses conventional gearing suitable to transmit power to said shaft 37 from drive shaft 14. The gear 38 on this single shaft 37 (which is shown as being the third from the left in Figure 4 although any one or more may be employed) actuates the common laterally extending drive shaft 40 through its companion gear 39. Shaft 40 through the driving relation of the remaining gears 38 and 39 drives the several remaining shafts 37.

It will also be understood that the knife blades 52 of each topping unit are to be rotated in opposite directions in the manner indicated by the arrows in Figure 7. This is accomplished by employing spiral gears 38, 39 which are cut so that the direction of rotation of the respective knife blades 52 of each unit 54 will be opposite to each other. Thus, when the tops are severed from the crowns of the beets, they are thrown backward by the rotating knife blades 52.

As the tops are thrown off the knife blades 52 they are picked up by the feeder means 65 (Figures 3 and 4) disposed directly behind each topping unit 54. The feeder means 65 include a laterally extending shaft 66 supported by bearing brackets 67 secured to the plate 68 extending crosswise of the apparatus. Plates 68 and a similar member 69 are adjustably supported from the inclined members 20 as by links 70 in which turnbuckles 71 are provided. A plurality of flexible pronged members or rakes 72 are secured to shaft 66 as by means of hubs 73 and have disposed therebetween arcuate members 74 which serve to scrape the tops free from rakes 72. Shaft 66 is driven from drive shaft 14 as by means of sprockets 75 and 76, respectively, and chain 77.

The tops severed from the beets next pass from rakes 72 to endless conveyor means 78 which is capable of being operated either to the left or to the right. Conveyor 78 is provided at each end with a shaft 79 on which is mounted a sprocket 80 (see Figure 8). Shaft 79 at one end or the other of conveyor 78 is actuated by sprocket 80 depending on the direction of travel of said conveyor through the sprocket 81 on the opposite end of each shaft 79 from the sprocket 80 and a chain 82 associated with said sprockets 81. Conveyor sprockets 83 which cooperate with chains 84 are secured to the shaft 79 at each end of conveyor 78 and are operated by whichever one of said shafts 79 is being driven so as to move the material to the left or right as the case may be.

Pivotally mounted upon the ends of the conveyor unit 78 as by means of plates 85 is a carrier unit such, for example, as an elevator means 86 which is provided with a typical sprocket and chain drive, as indicated in Figure 2 of the drawings. The elevators 86 are adapted to be raised or lowered by means of the manually operated hoist 87 about the drum of which is wrapped a cable 88 in such fashion that as the crank 89 is rotated in a clockwise direction the elevator 86 at the left of the conveyor 78 is caused to be raised and the elevator 86 to the right thereof is caused to be lowered by virtue of the pivotal connection of said elevator 86 about the shaft 79 afforded by the plates 85 disposed at the ends of said shaft 79. It will be understood that a counterclockwise rotation of crank 89 has a reverse effect to that above described.

The drive for each elevator 86 is effected through any suitable driving means, such, for example, as a shaft 90 which transmits the drive from drive shaft 14 through the gear case 64 to a reversible transmission means 91, through an extensible shaft means 92 which is suitably flexibly coupled to the output shaft of said transmission 91 and thence to a shaft 94 adjacent the free end of each of said elevators 86. Each of said shafts 94 is driven by a gear box 93 in which is enclosed conventional gearing to provide the desired driving engagement between said shaft 94 and extensible shaft 92.

It will be noted from Figure 1 that the left-hand elevator 86 has its extensible shaft 92 directly connected to the output shaft of the transmission 91 whereas the extensible shaft 92 for the right-hand elevator 86 is connected to an intermediate shaft 95 which is supported in substantially horizontal relation in the bearing supports 96. A shift lever 97 for the transmission 91 is employed to transfer the drive effected by the vertically extending shaft 90 to either one or the other of the two extensible shafts 92 connected therewith and is so designed that when one of said shafts is being actuated the other is idle.

The drive shaft 94 adjacent the free end of elevator 86 is connected as by means of a chain and sprocket drive 98 with the horizontal shaft 99 disposed at the lowermost end of said elevator member 86. Shaft 99 is provided, at the end thereof opposite that to which the drive means 98 is connected, with a sprocket member 100. Associated with said sprocket member 100 is a suitable uni-directional driving means such, for example, as the overrunning clutch 101, which is operatively engaged with shaft 99 to actuate sprocket 100 when the shaft 99 is operating but rotates with respect to shaft 99 when said shaft 99 is idle. Thus, it will be seen from Figures 1 and 8, that when the elevator 86 to the left in Figure 1 is operating, its shaft 99 will be actuated by transmission 91, shaft 92, shaft 94 and chain and sprocket drive 98. When shaft 99 is rotated clutch 101 is engaged and through chain 102 drives sprocket 80 and shaft 79 of conveyor 78 so that the uppermost surface of the conveyor unit moves to the left.

During this operation the shaft 99 for elevator 86 at the right in Figure 1 is idle and its overrunning clutch 101 is disengaged and causes sprocket member 100 associated therewith to rotate freely with respect to this shaft 99. It will be understood that the exact reverse of these operations takes place when the shift lever 97 of transmission 91 is shifted setting the right hand elevator 86 in operation and causing the shaft 99 of the left hand elevator 86 to cease functioning. Thus, the direction of operation of conveyor 78 is dependent upon which of the elevators 86 is being actuated by transmission 91.

When the elevator 86, to the left of the apparatus as seen in Figure 1 of the drawings, is being operated, the conveyor 78 is caused to be driven to the left to pass the beet tops from the topping units 54 to the elevator 86 for loading the same into a suitable vehicle or conveyance. In the same way, when the right-hand elevator means 86 is actuated the overrunning clutch 101 associated with the shaft 99 thereof will actuate a similar sprocket 80 upon the shaft 79 of conveyor 78 to the end that the chain 102 associated therewith causes the conveyor 78 to pass the material thereon to the right-hand elevator 86.

It will be readily understood that any suitable form of casing or enclosure may be provided for the chain and sprocket drive members associated with the conveyor 78, elevators 86, as well as the plates 85 and overrunning clutch mechanism 101 for shiftably actuating the conveyor 78. All such shrouds or casings have been omitted from the illustrated embodiment of the invention for the sake of clarity and for the purpose of simplifying the description thereof.

As previously indicated, the apparatus of the instant invention may be conveniently attached to any form of motive power such, for example, as a tractor 10, to which it is suitably secured as by means of the frame structure including cross-bar 19 and supporting member 20. It will, of course, be understood that any suitable means of propelling the beet topping apparatus may be employed. In traveling to and from the field where the cutting operation is to take place, the elements of the topping units 54 will be supported so as to be out of engagement with the surface of the ground, by means of the lever arm 55 and the hoist structure associated therewith.

Upon reaching the field in which the produce to be topped is growing, the tractor 10 is placed in the direction of the rows of beets or the like which are to be topped and the hoisting means controlled by lever 55 is released so as to permit the guide members 49 to traverse the surface of the ground and the crowns of the beets therein. As the tractor 10 is moved along the rows of beets, the guide member 49 for each topping unit 54 is rotated about the pin 46 and supported upon the ground surface as by means of the generally cylindrical members 103 adjustably secured to the faces of the guide member 49 by means of a plurality of angles 104 and bolts 105.

The substantially cylindrical members 103 secured to said guide member 49 are advantageously formed of a rolled sheet or strip material with overlapping ends 106 to permit said member 103 to be increased or diminished in its overall circumference. The adjustment of the periphery of the member 103 is accomplished by loosening the bolts 105 which are disposed in slotted openings 107 in said angle members 104, increasing or decreasing the size of member 103 as desired and again tightening bolts 105 in position.

It will be apparent from the foregoing, that the height of knives 52 with respect to the surface of the ground and the crowns of the beets to be topped may be varied by changing the spacing between the axis of rotation of guide member 49 about the pin 46 and the surface of the members 103. This may be accomplished by increasing or decreasing the circumference of the members 103 on the faces of said guide member 49. The depth of the cut in the crown of the beets or the like performed by the pair of knives 52 associated with guide member 49, will therefore, be controlled by the extent to which the guide member 49 is permitted to cut down into the tops of the beets.

The pair of knives 52 are rotated by the shafts 37 either directly from the drive take-off, as in the case of at least one of the shafts 37 or from the common driving member 40 through the companion gears 38 and 39. Since the knives 52 are rotated in opposite directions, the beet tops will be severed from the crowns of the beets as the machine approaches each individual one thereof and will carry the tops toward the rear of the structure at which point they will be picked up by the feeding means 65. Feeding means 65 feeds the severed tops to the conveyor 78 by means of which, depending upon the direction of its travel, the material will be directed to the elevator 86 which is being operated and finally deposits said tops in a suitable conveyance for removing said tops from the field.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In an implement for topping beets or like produce while still in the ground, a guide means associated with the cutting means for severing the beet growth, said guide means comprising a disk member mounted for rotation about a substantially horizontal axis, a generally cylindrical member mounted upon the face of said disk, said cylindrical member comprising a one-piece flexible strip with the ends slidably overlapping, and means for adjusting the diameter of said cylindrical member and thereby regulating the height of the axis of rotation of the disk member above the surface of the ground and the crown of the beets therein.

2. In an implement for topping beets or like produce while still in the ground, a guide means associated with the cutting means for severing the beet growth, said guide means comprising a disk member mounted for rotation about a substantially horizontal axis, a substantially cylindrical member mounted upon each face of said disk and encircling the axis of rotation thereof, said cylindrical member comprising a one-piece flexible strip with the ends slidably overlapping, and means for adjusting the circumferential dimension of each of said substantially cylindrical members.

3. A beet topping machine, comprising a tractor, a housing extending transversely of the tractor body, pairs of tubular structures depending from said housing and each comprising an upper portion fixed to the housing and a lower portion telescopingly engaging the upper portion, said tubular structures being non-rotatable, a longitudinally extensible drive shaft in each of said tubular structures, a horizontal cutting disk secured to the lower end of each shaft structure, the cutting disks for each pair of tubular structures being in the same horizontal plane and with their peripheral edges opposed to each other, a bracket secured to the lower tubular portions of each pair of tubular structures and extending forwardly therefrom, a vertical guide and cutter disk journalled in each bracket in a plane tangential to the opposed edges of the horizontal cutters, said guide and cutter disks rolling across and cutting down into the tops of beets in advance of the corresponding pairs of horizontal cutting disks for guiding said horizontal disks for topping of the beets during forward travel of the tractor, circular flanges on opposite sides of each vertical disk for determining the distance of cut thereby into the beets, a drive shaft extending through said housing and having driving connection with the shaft of the respective pairs of tubular structures for rotation of the corresponding horizontal cutting disks in opposite direction, and a driving source for said drive shaft.

4. A beet topping machine, comprising a tractor, a housing extending transversely of the tractor body, pairs of tubular structures depending from said housing and each comprising an upper portion fixed to the housing and a lower portion telescopingly engaging the upper portion, said tubular structures being non-rotatable, a longitudinally extensible drive shaft in each of said tubular structures, a horizontal cutting disk secured to the lower end of each shaft structure, the cutting disks for each pair of tubular structures being in the same horizontal plane and with their peripheral edges opposed to each other, a bracket secured to the lower tubular portions of each pair of tubular structures and extending forwardly therefrom, a vertical guide and cutter disk journalled in each bracket in a plane tangential to the opposed edges of the horizontal cutters, said guide and cutter disks rolling across and cutting down into the tops of beets in advance of the corresponding pairs of horizontal cutting disks for guiding said horizontal disks for topping of the beets during forward travel of the tractor, circular flanges on opposite sides of each vertical disk for determining the distance of cut thereby into the beets, a drive shaft extending through said housing and having driving connection with the shaft of the respective pairs of tubular structures for rotation of the corresponding horizontal cutting disks in opposite direction, and a driving source for said drive shaft, said flanges on said vertical disks being adjustable for circumferential expansion or contraction thereof whereby to adjust for the distance of down cut in the beets and thereby the depth of topping of the beets by the pairs of horizontal cutting disks.

5. In a beet topping machine, a topping unit comprising a vertically movable frame, a pair of drive shafts rotatable in said frame but held against axial movement therein, horizontal cutter disks secured to the ends of said shafts in a common horizontal plane for cutting engagement with beets for topping thereof, a guide roller on said frame in advance of said cutter disks for engagement with the tops of the beets for guidance of the cutter disks into engagement with the beets, said roller comprising a one-piece flexible strip with the ends slidably overlapping and being adjustable for circumferential expansion or contraction whereby its engagement with the tops of the beets will determine the plane of cutting of the beets by said cutter disks.

6. In a beet topping machine, a topping unit comprising a vertically movable frame, a pair of drive shafts rotatable in said frame but held against axial movement therein, horizontal cutter disks secured to the ends of said shafts in a common horizontal plane for cutting engagement with beets for topping thereof, a guide roller on said frame in advance of said cutter disks for engagement with the tops of the beets for guidance of the cutter disks into engagement with the beets, said roller being adjustable for circumferential expansion or contraction whereby its engagement with the tops of the beets will determine the plane of cutting of the beets by said cutter disks, and a cutter disk on said roller concentric therewith for cutting down into the beets to a depth limited by said roller whereby to further guide the cutting engagement of said horizontal cutter disks with the beets.

7. A beet topping machine comprising, in combination, a tractor, a housing extending transversely of the tractor body, pairs of tubular structures depending from said housing and each comprising an upper portion fixed to the housing and a lower portion telescopingly engaging the upper portion, said tubular structures being non-rotatable, a longitudinally extensible drive shaft in each of said tubular structures, a horizontal cutting disk secured to the lower end of each shaft structure, the cutting disks for each pair of tubular structures having their peripheral edges so disposed with relation to each other as to receive and sever a beet top therebetween, a bracket secured to the lower tubular portions of each pair of tubular structures and extending forwardly therefrom, and a vertical guide and cutter disk journaled in each bracket in a plane substantially tangential to the opposed edges of the horizontal cutters, said guide and cutter disks rolling across and cutting down into the tops of beets in advance of the corresponding pairs of horizontal cutting disks for guiding said horizontal disks for topping of the beets during forward travel of the tractor.

8. A beet topping machine comprising, in combination, a tractor, a housing extending transversely of the tractor body, pairs of tubular structures depending from said housing and each comprising an upper portion fixed to the housing and a lower portion telescopingly engaging the upper portion, said tubular structures being non-rotatable, a longitudinally extensible drive shaft in each of said tubular structures, a horizontal cutting disk secured to the lower end of each shaft structure, the cutting disks for each pair of tubular structures having their peripheral edges so disposed with relation to each other as to receive and sever a beet top therebetween, a bracket secured to the lower tubular portions of each pair of tubular structures and extending forwardly therefrom, a vertical guide and cutter disk journaled in each bracket in a plane substantially tangential to the opposed edges of the horizontal cutters, said guide and cutter disks rolling across and cutting down into the tops of beets in advance of the corresponding pairs of horizontal cutting disks for guiding said horizontal disks for topping of the beets during forward travel of the tractor, and means for lifting said lower tubular portions and said brackets and thereby telescoping said tubular structure and contracting said shaft to clear the ground when the machine is out of operation.

9. In combination in a mechanism of the character described including a supporting framework adapted to be carried above ground level by a tractor or the like for motivating the same, a pair of spaced parallel members depending vertically from the framework to a point intermediate the framework and the ground level, mounting members telescopically co-operating with said depending members for free telescopic protraction and retraction, each of said depending members and the companion mounting member defining a variable length vertical shaft housing, co-ordinately driven respective extensible shafts rotatable within said shaft housings, each of said shafts comprising sections corresponding to the telescopic members and being respectively rotatably but non-axially movable within the members and coupled for joint rotation, co-operating horizontal rotary cutters carried by the lower ends of the shafts beyond the lower ends of the mounting members, and means on the mounting members for protracting or retracting said mounting members and thereby said rotary cutters.

10. A combination as defined in claim 9 in which the protracting and retracting means on the mounting members comprises a pilot wheel carried jointly by the mounting members to travel in advance of the cutters, and a raising and lowering structure operable at will to retract the mounting members and thereby lift the cutters and the pilot wheel to inactive position with ample free traveling clearance from the ground and to lower them to working position on the ground.

11. In combination in a beet topping mechanism, a supporting framework adapted to be supported by a motivating vehicle at substantial elevation above the ground, spaced parallel members depending vertically from the framework to an intermediate elevation but substantially spaced above the ground, mounting members vertically slidably related to said depending members, a driven shaft carried by each of the depending members and its companion mounting member and comprising a pair of sections corresponding to the members rotatably coupled but axially fixed with respect to the respective members, co-operative horizontal rotary beet top cutters respectively carried by the lower end of the shaft, a forwardly extending bracket structure carried jointly by a plurality of said mounting members and securing them into a jointly movable unit, and a pilot wheel supported by said bracket to run in advance of the beet top cutters for determining the cutting level of the latter, the pilot wheel compensating for irregularities in the working level of the ground surface by free up and down movement of the mounting members therewith as permitted by the relatively slidable relationship of the mounting members and the depending members.

12. In combination in a beet topping mechanism, a supporting framework adapted to be supported by a motivating vehicle at a substantial elevation above the ground, spaced parallel members depending vertically from the framework to an intermediate elevation but substantially spaced above the ground, mounting members vertically slidably related to said depending members, a driven shaft carried by each of the depending members and its companion mounting member and comprising a pair of sections corresponding to the members rotatably coupled but axially fixed with respect to the respective members, cooperative horizontal rotary beet top cutters respectively carried by the lower ends of the shafts, means connecting said mounting members fixedly together into a unit for joint protractional and retractional movement, and means for altering the elevation of said beet top cutters by raising or lowering the mounting member unit.

13. In combination in a machine of the character described, a supporting frame structure, vertically depending tubular members on said supporting frame structure, said tubular members being adapted to project to within a substantially spaced distance from the ground surface over which the machine is adapted to be transported in operation, a telescopically related tubular extension on each of said depending members and extending down close to the ground, an extensible shaft extending through each of said depending members and the extension thereof, a yoke connecting said extensions into a jointly movable unit, cutting elements on the lower ends of said shafts and adapted to be positioned at a cutting elevation by the vertical position of said extension unit, and means working through said yoke for raising and lowering the extension unit to thereby raise and lower the cutting elements.

14. The combination as defined in claim 13 in which the raising and lowering means comprises a pawl and ratchet lever mechanism carried by the frame structure.

15. As an attachment for an agricultural tractor, a supporting framework structure adapted to be secured beneath the tractor between the front and rear wheels thereof and at a substantial elevation above the traction surface for the tractor, a plurality of spaced parallel vertical tubular members depending fixedly from said framework and adapted to have the ends thereof disposed in substantially spaced relation to said traction surface in the mounted relation of the framework, tubular extensions telescopically supported by said depending members and cooperating therewith to define respective vertical extensible and retractable shaft housings, extensible shafts respectively rotatably supported within said housings and each having a cutter element at the lower end thereof below the end of the companion tubular extension, and means for vertically adjusting said extensions relative to said depending tubular members for defining the elevational relationship of said cutters to the traction surface.

16. In combination in a beet topping apparatus, a supporting frame structure, a pair of spaced parallel vertical rotary shaft members, horizontal rotary cutter blades fastened on the lower ends of the respective shaft members and adapted to cooperate in cutting the top off of a beet when rotated while moved together in a horizontal cutting plane through the crown of the beet, means for rotating said shaft members including coupling members mounted for rotation in a fixed axial position, means for rotatably driving said coupling members, said shaft members being freely axially movable within substantial limits relative to said coupling members and connected to said coupling members for joint rotation therewith, whereby the shaft members and the rotary cutter blades are driven rotatably by said driving means, a pilot wheel for controlling the elevation of the cutting plane of the cutter blades in operation, means carrying said pilot wheel for rotation on a horizontal axis in advance of the point where the cutter blades are in active cutting cooperation, means assembled with said shaft members for joint vertical movement therewith and also connected for joint pilot wheel affected movement with said pilot wheel carrying means, and means connected to said last two mentioned means for raising and lowering the cutter blades and the pilot wheel together by axially moving the shaft members relative to said coupling members.

17. In combination in a beet topping apparatus, a supporting frame structure, a pair of spaced vertical rotary shafts having horizontal rotary cutter blades secured on the lower end thereof and of such diameter as to cooperate at the adjoining portions of their cutting edges to top beets when driven in a horizontal cutting plane through the crown portions of the beets standing in a row, coupling means carried by said frame structure and held substantially against vertical movement relative to the frame structure, means for driving said coupling means rotatably, said shafts being assembled with said coupling means for relatively free vertical movement but joint rotational movement, a pilot wheel assembled with said shafts and operable to ride on a horizontal axis in advance of the cooperating cutting edge portions of the cutter blades and operative to control the elevation of the cutting blades for optimum beet topping results, and means for effecting joint vertical movement of the pilot wheel and the shafts other than vertical movement effected by operation of the pilot wheel itself, said last mentioned means including a structure assembled with and extending between said shaft members and a lever connected to such structure for raising and lowering the pilot wheel and the shaft members with the cutter blades into and out of inactive position by moving the shaft members vertically relative to the coupling means.

FREDERICK A. TRINKLE.
JACK SCHWINDT.

REFERENCES CITED

The following references are of record in the file of this patent:

UNITED STATES PATENTS

| Number | Name | Date |
| --- | --- | --- |
| 978,908 | Leary | Dec. 20, 1910 |
| 1,072,218 | Fanger | Sept. 2, 1913 |
| 1,164,163 | Blair | Dec. 14, 1915 |
| 1,200,955 | Lawson | Oct. 10, 1916 |
| 1,251,589 | Steil | Jan. 1, 1918 |
| 1,258,456 | Pulver | Mar. 5, 1916 |
| 1,283,810 | Kuky | Nov. 5, 1918 |
| 1,327,760 | Johnson | Jan. 13, 1920 |
| 1,548,888 | Kiest | Aug. 11, 1925 |
| 1,864,031 | Seelinger | June 21, 1932 |
| 1,881,145 | Stolze | Oct. 4, 1932 |
| 1,957,108 | Pierson | May 1, 1934 |
| 2,251,832 | Levin | Aug. 5, 1941 |

FOREIGN PATENTS

| Number | Country | Date |
| --- | --- | --- |
| 16,743 | France | Jan. 30, 1913 |